United States Patent
Abe

(10) Patent No.: US 7,847,810 B2
(45) Date of Patent: Dec. 7, 2010

(54) IMAGE FORMING APPARATUS

(75) Inventor: Naoki Abe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/401,868

(22) Filed: Mar. 11, 2009

(65) Prior Publication Data

US 2009/0245830 A1    Oct. 1, 2009

(30) Foreign Application Priority Data

Mar. 28, 2008    (JP)    ............................. 2008-087246

(51) Int. Cl.
  *B41J 2/385*    (2006.01)
(52) U.S. Cl. .................................... 347/116
(58) Field of Classification Search ................. 347/116, 347/229, 234, 248–250, 235
  See application file for complete search history.

(56) References Cited

U.S. PATENT DOCUMENTS

| 5,444,525 | A   | 8/1995  | Takahashi et al. |
| 7,391,430 | B2  | 6/2008  | Mitani |
| 2004/0239747 | A1 | 12/2004 | Maeda |
| 2006/0262176 | A1* | 11/2006 | Kim et al. ................. 347/116 |
| 2007/0140721 | A1 | 6/2007  | Shinohara et al. |
| 2009/0122368 | A1* | 5/2009  | Saito et al. ................. 358/504 |
| 2009/0123197 | A1* | 5/2009  | Okumura et al. ............ 399/301 |

FOREIGN PATENT DOCUMENTS

| JP | 07-225544    | 8/1995 |
| JP | 09-185192    | 7/1997 |
| JP | 11-020239    | 1/1999 |
| JP | 2000-267540  | 9/2000 |
| JP | 2005-119198  | 5/2005 |
| JP | 2005-170033  | 6/2005 |
| JP | 2007-155750  | 6/2007 |

OTHER PUBLICATIONS

Notification of Reasons of Refusal for Japanese Patent Application 2008-087246 mailed Apr. 6, 2010.
Search Report in connection with EP counterpart application No. EP09003825.8 dated Jun. 14, 2010.
Notification of Reasons for Refusal for corresponding Japanese Patent Application 2008-087246 mailed on Aug. 3, 2010.

* cited by examiner

*Primary Examiner*—Hai C Pham
(74) *Attorney, Agent, or Firm*—Banner & Witcoff, Ltd.

(57) ABSTRACT

An image forming apparatus is provided. A second photoconductor is disposed at a downstream side of a first photoconductor in a moving direction of a medium. First and second exposure units form first and second electrostatic latent images on the first and second photoconductors line by line at first and second exposure timing intervals in first and second exposure enabling time periods based on successive lines of first and second image data, respectively. A correction unit corrects at least one of the first and second exposure timing intervals. A change unit changes the second exposure enabling time period so as to suppress a difference between the number of the successive lines of the first image data and the number of the successive lines of the second image data.

9 Claims, 13 Drawing Sheets

FIG. 7

| NUMBER N | PULSE INTERVAL DATA W(N)[μs] | POST-CORRECTED TIMING INTERVAL J(N)[μs] | CORRECTION VALUE ΔJ(N)[μs] |
|---|---|---|---|
| 1 | W(1) | J(1) | ΔJ(1) |
| 2 | W(2) | J(2) | ΔJ(2) |
| 3 | W(3) | J(3) | ΔJ(3) |
| 4 | W(4) | J(4) | ΔJ(4) |
| ... | ... | ... | ... |
| N'/2 | W(N'/2) | J(N'/2) | ΔJ(N'/2) |
| ... | ... | ... | ... |
| N'-2 | W(N'-2) | J(N'-2) | ΔJ(N'-2) |
| N'-1 | W(N'-1) | J(N'-1) | ΔJ(N'-1) |
| N' | W(N') | J(N') | ΔJ(N') |

*FIG. 12*

| ROTATION PHASE | NORMAL TIME PERIOD | | | |
|---|---|---|---|---|
| | SHEET SIZE A | SHEET SIZE B | SHEET SIZE C | ... |
| ROTATION PHASE 1 | T1A(1) | T1B(1) | T1C(1) | ... |
| ROTATION PHASE 2 | T1A(2) | T1B(2) | T1C(2) | ... |
| ROTATION PHASE 3 | T1A(3) | T1B(3) | T1C(3) | ... |
| ... | ... | ... | ... | ... |
| ROTATION PHASE N' | T1A(N') | T1B(N') | T1C(N') | ... |

IMAGE FORMING APPARATUS

CROSS-REFERENCE TO RELATED APPLICATION

This application claims priority from Japanese Patent Application No. 2008-087246, filed on Mar. 28, 2008, the entire subject matter of which is incorporated herein by reference.

TECHNICAL FIELD

Aspects of the present invention relate to an electrophotographic image forming apparatus.

BACKGROUND

An electrophotographic image forming apparatus may adopt a tandem system wherein a plurality of photoconductors provided in one-to-one correspondence with colors are arranged along a moving direction of a transfer medium. When forming an image, while the photoconductors are rotated, an electrostatic latent image based on successive lines of color image data is exposed on the photoconductor line by line by an exposure unit and successive lines of visible image formed on the photoconductor by developing the electrostatic latent image is transferred from the photoconductor to the transfer medium. This operation is performed in order from the upstream photoconductor to the downstream photoconductor, whereby a color image (combined image) is formed on the transfer medium.

If the rotation speed of each photoconductor is always constant, the successive lines of the electrostatic latent image is exposed on the photoconductor at a fixed time interval. Therefore, it is possible to form a color image which comprises successive lines arranged at a uniform transfer position interval. In fact, however, the rotation speed of the photoconductor fluctuates periodically and thus the transfer position intervals of the one color image may become different from that of another color image. Therefore, it may cause deterioration of the image quality and an abnormal image may be formed on the transfer medium.

If the image forming apparatus includes a transfer rotation body to which each one-line visible image is transferred directly or indirectly from the photoconductor, such as an intermediate transfer belt or a sheet conveying belt, for example, variations in the transfer position interval may also occur due to rotation speed fluctuation of the transfer rotation body as well as the photoconductor.

Then, hitherto, an image forming apparatus capable of suppressing variations in the transfer position interval caused by rotation speed fluctuation of the photoconductor has been available. (see JP-A-Hei. 7-225544) Specifically, the timing interval of exposure processing for adjacent lines is changed in response to rotation speed fluctuation of the photoconductor.

The related art image forming apparatus can suppress variations in each one-line transfer position interval. However, it is not possible to suppress deterioration of the image quality caused by the other factors.

In the related art image forming apparatus, the lengths of each of the exposure enabling time periods corresponding to each of the photoconductors are the same with each other. However, since the rotation speed fluctuation characteristic varies from one photoconductor to another, if correction processing of the exposure timing interval is performed so as to adjust the transfer position interval between successive lines of the visible image based on successive lines of image data, the number of lines of the image data to be subjected to exposure processing within the exposure enabling time period (the total number of lines) varies from one photoconductor to another and thus the quality of the image transferred to a transfer medium may be deteriorated. The transfer line interval may vary due to not only the periodical speed fluctuation of the photoconductor but also short-term speed fluctuation of the photoconductor or speed fluctuation of any other rotation body used in the exposure processing and the transfer processing, such as a conveying belt. When suppressing these fluctuations, a color image which is different in the total number of lines from one color to another may be formed.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image forming apparatus capable of suppressing deterioration of the image quality caused by rotation speed fluctuation of a photoconductor and a transfer rotation body.

According to an exemplary embodiment of the present invention, there is provided an image forming apparatus comprising: a first photoconductor; a second photoconductor disposed at a downstream side of the first photoconductor in a moving direction of a medium; a first exposure unit which is configured to form a first electrostatic latent image on the first photoconductor line by line at first exposure timing intervals in a first exposure enabling time period based on successive lines of first image data; a second exposure unit which is configured to form a second electrostatic latent image on the second photoconductor line by line at second exposure timing intervals in a second exposure enabling time period based on successive lines of second image data; a correction unit which is configured to correct at least one of the first exposure timing intervals so as to adjust first transfer position intervals between successive lines of a first visible image provided by developing the first electrostatic latent image and the second exposure timing intervals so as to adjust second transfer position intervals between successive lines of a second visible image provided by developing the second electrostatic latent image; and a change unit which is configured to change the second exposure enabling time period so as to suppress a difference between the number of the successive lines of the first image data for forming the first electrostatic latent image on the first photoconductor in the first exposure enabling time period and the number of the successive lines of the second image data for forming the second electrostatic latent image on the second photoconductor in the second exposure enabling time period.

According to the above configuration, deterioration of the image quality caused by rotation speed fluctuation of the photoconductor and transfer rotation body can be suppressed.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 7 is a table listing the relationship between the pulse interval W and a correction value according to the first embodiment;

FIG. 12 is a schematic diagram illustrating data composition of a correspondence table among sheet size, rotation phase, and normal time period according to a second embodiment of the present invention.

DETAILED DESCRIPTION

First Embodiment

General Configuration of Printer

A first embodiment of the invention will be discussed with reference to FIGS. 1 to 11.

Figure 1:
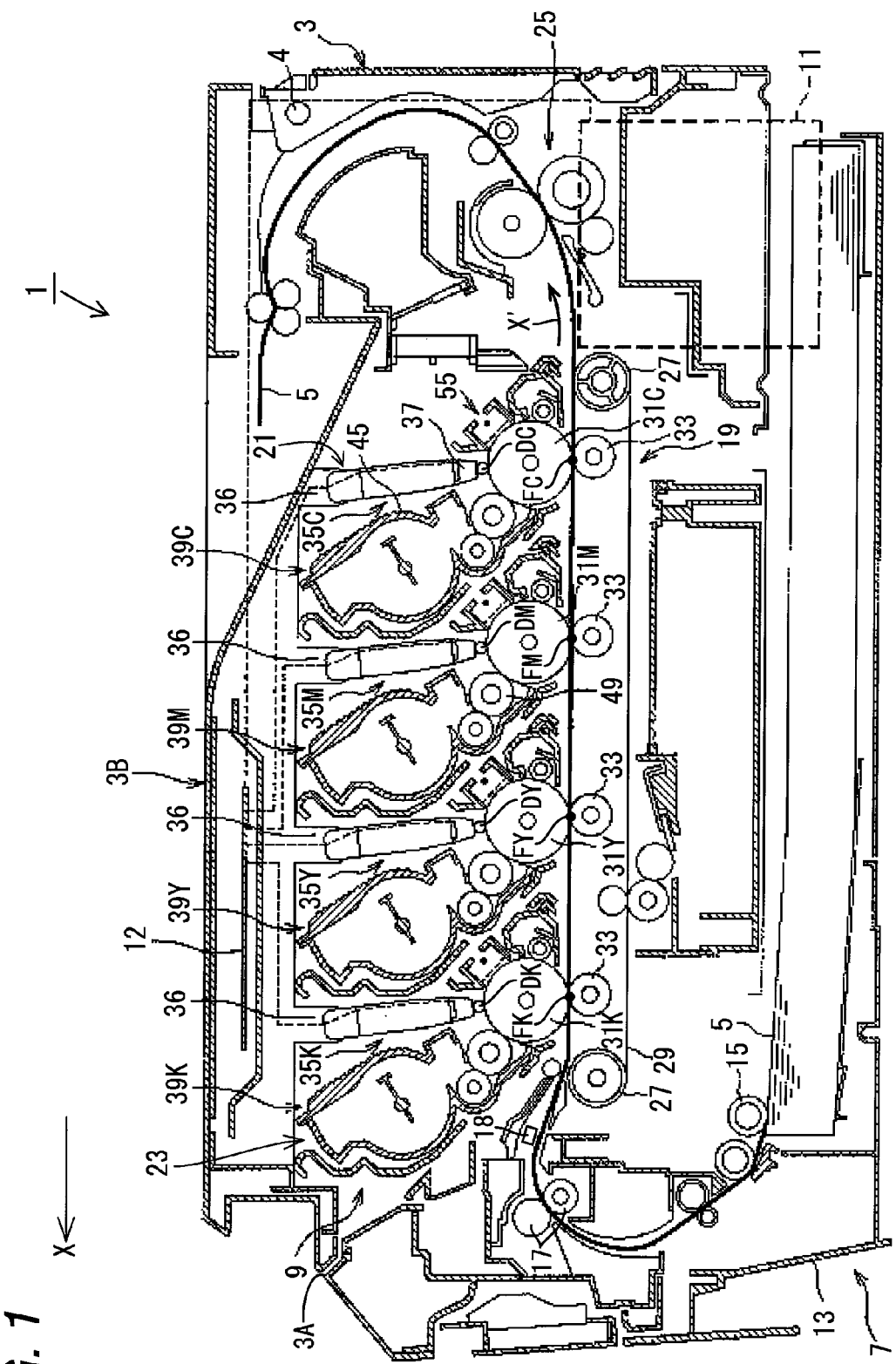
FIG. 1 is a sectional side view illustrating a schematic configuration of a printer according to a first embodiment of the present invention (in a state in which a cover is closed)

FIG. 1 is a sectional side view illustrating a schematic configuration of a printer 1 (an example of the image forming apparatus) of the first embodiment of the present invention. In the description to follow, the left direction of the plane of FIG. 1 is the front direction of the printer 1 and is shown as X direction in the accompanying drawings. The printer 1 is a color printer for forming a color image in toners of four colors (black K, yellow Y, magenta M, and cyan C). Hereinafter, to distinguish components from each other according to the color, K (black), Y (yellow), M (magenta), or C (cyan) to mean each color will be suffixed to the reference numeral of each component.

The printer 1 includes a casing 3 having a top face formed with an opening 3A, and a cover 3B is provided so as to close the opening 3A in such a manner that it can be opened and closed with a rotation shaft 4 as a supporting point. Mainly provided in the casing 3 are a supply unit 7 for supplying a sheet of paper 5 (an example of a transfer medium), an image formation unit 9 for forming an image on the sheet 5 supplied from the supply unit 7, and a main control circuit 11 (an example of a first control circuit) for controlling the units at the image forming time.

The supply unit 7 includes a sheet feed tray 13 placed in the bottom of the casing 3 where the sheets 5 mainly are stacked, a sheet feed roller 15, and registration rollers 17. The sheet feed roller 15 is provided on the upper front of the sheet feed tray 13, and the sheet 5 stacked on the top in the sheet feed tray 13 is delivered to the registration rollers 17 with rotation of the sheet feed roller 15. The registration rollers 17 make a skew correction to the sheet 5 and then convey the sheet 5 to a belt unit 19 of the image formation unit 9. A registration sensor 18 is provided in front of the belt unit 19 and outputs a detection signal R responsive to the presence or absence of the sheet 5 (in the embodiment, the signal is designed in negative logic and low signal is indicated in a time chart at the first stage of FIG. 4).

The image formation unit 9 mainly includes the belt unit 19, an exposure unit 21 (an example of an exposure unit), a process unit 23, and a fixing unit 25.

The belt unit 19 has an annular belt 29 stretched between front and rear paired belt support rollers 27. The rear belt support roller 27 is rotated, whereby the belt 29 is circulated clockwise in the figure and the sheet 5 on the top of the belt 29 is conveyed backward (an example of a moving direction of a transfer medium, which will be hereinafter referred to as "sheet conveying direction (subscanning direction) X'". Transfer rollers 33 are provided inside the belt 29 at positions facing photoconductors 31 (31K, 31Y, 31M, and 31C) of the process unit 23 described later with the belt 29 between. In the description to follow, the expression "upstream or downstream" with no direction indicated is used to mean upstream or downstream in the sheet conveying direction X'.

The exposure unit 21 includes four LED units 35 (35K, 35Y, 35M, and 35C) corresponding to the colors of black, yellow, magenta, and cyan. Each of the LED units 35 is supported on the lower face of the cover 3B by a support member 36 and has an LED head 37 in the lower end part. The LED head 37 has LEDs (not shown) arranged in a row from side to side. Light emission of each LED is controlled based on print data of the image to be formed; light emitted from each LED is applied to the surface of the photoconductor 31, whereby the surface is exposed. An LED control circuit 12 (an example of a second control circuit) is housed in the cover 3B.

The process unit 23 includes four process cartridges 39 (39K, 39Y, 39M, and 39C) corresponding to the four colors (K, Y, M, and C). Each of the process cartridges 39 includes a toner storage chamber 45 for storing color toner of a developer, a developing roller 49 for carrying the toner emitted from the toner storage chamber 45, the photoconductor 31, a scorotron-type charger 55, etc.

When an image is formed, the photoconductor 31 is rotated and accordingly the surface of the photoconductor 31 is uniformly positively charged by the charger 55. The positively charged area is exposed to light from the corresponding LED head 37 at an exposure position D (DK, DY, DM, DC) opposed to the LED head 37 and an electrostatic latent image corresponding to the image to be formed is formed on the surface of the photoconductor 31.

Next, the developing roller 49 is rotated, whereby the positively charged toner carried on the developing roller 49 is supplied to the electrostatic latent image formed on the surface of the photoconductor 31. Accordingly, the electrostatic latent image on the photoconductor 31 is developed and a toner image (visible image) with the toner deposited only on the exposed portion is carried on the surface of the photoconductor 31.

Then, the toner image carried on the surface of each photoconductor 31 is transferred to the sheet 5 in order according to a negative-polarity transfer voltage applied to the transfer roller 33 while the sheet 5 conveyed on the belt 29 passes through each transfer position F (FK, FY, FM, FC) between the photoconductor 31 and the transfer roller 33. The sheet 5 to which the toner image is thus transferred is conveyed to the fixing unit 25, which then thermally fixes the toner image transferred onto the sheet 5 on the plane thereof. Then, the sheet 5 is conveyed upward and is discharged to the top face of the casing 3.

(Drive Mechanism of Photoconductors)

Figure 2:
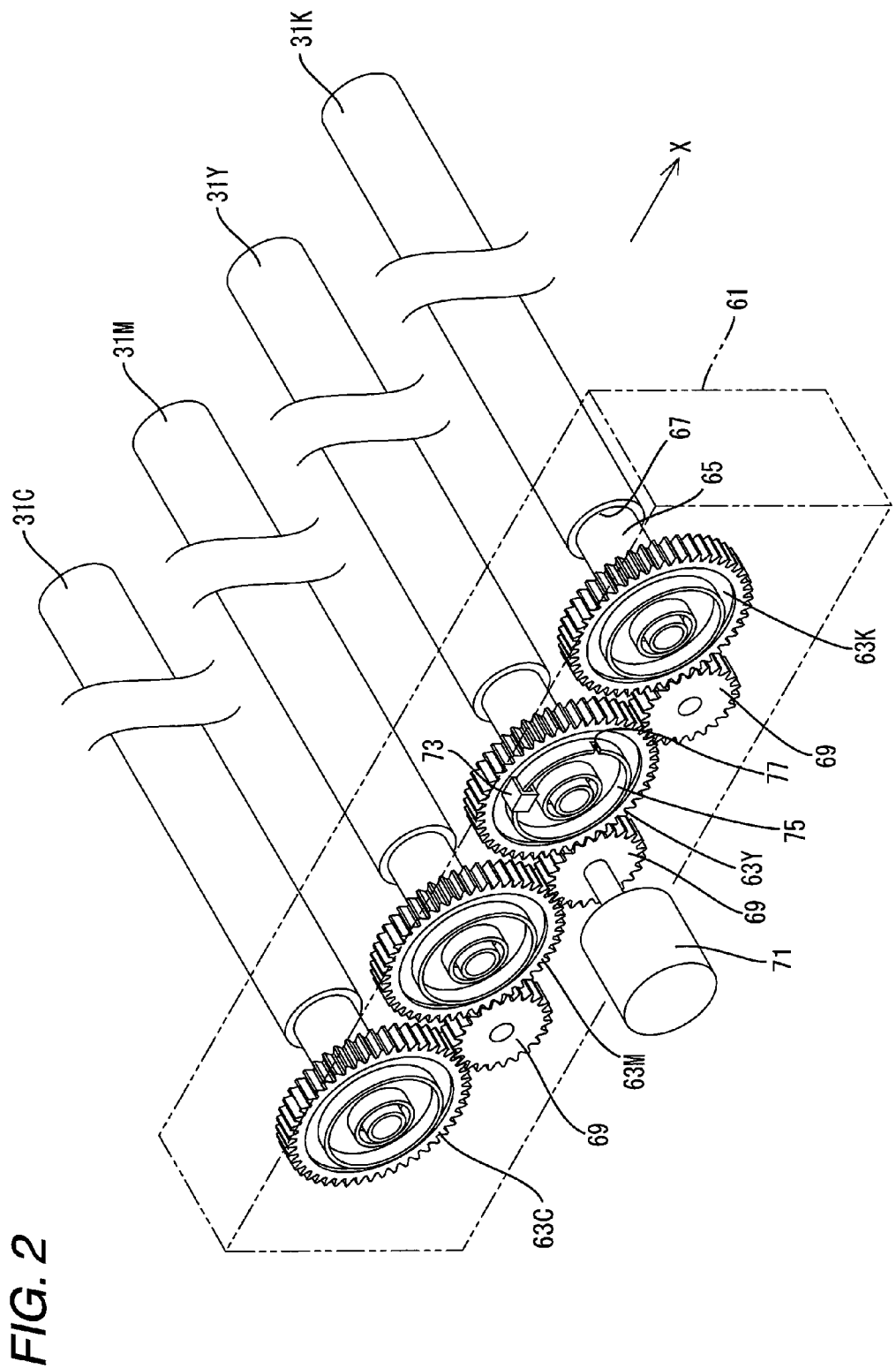
FIG. 2 is a schematic perspective view illustrating a drive mechanism according to the first embodiment.

FIG. 2 is a schematic perspective view illustrating a drive mechanism 61 for rotating the four photoconductors 31. The drive mechanism 61 is placed on the side of one end of each of the four photoconductors 31. It is provided with four drive gears 63 (63K, 63Y, 63M, and 63C) corresponding to the four photoconductors 31. Each of the drive gears 63 is provided rotatably on the same axis as the photoconductor 31 corresponding to the drive gear and is joined to the photoconductor 31 by a known coupling mechanism. Specifically, each of the drive gears 63 is formed coaxially with a projecting fit part 65, which is fitted into a recess 67 formed in the end of the photoconductor 31 to allow the photoconductor 31 to rotate integrally with rotation of the drive gear 63. The fit part 65 can move between a fit position shown in FIG. 2 and an apart position from the photoconductor 31. When the process cartridge 39 is detached, the fit part 65 moves to the apart position, whereby it is made possible to remove the process cartridge 39 from the casing 3.

The adjacent drive gears 63 are gear-joined through an intermediate gear 69. In the embodiment, a drive force from a drive motor 71 is given to the intermediate gear 69 positioned at the center (the intermediate gear 69 for joining the drive gears 63Y and 63M), whereby the four drive gears 63 and the four photoconductors 31 rotate together.

One drive gear 63 (in the embodiment, the drive gear 63Y) is provided with an origin sensor 73 (an example of a detection unit). This origin sensor 73 is a sensor for detecting whether or not the rotation phase (rotation angle) of each drive gear 63 reaches a predetermined origin phase (an example of a reference rotation phase).

Specifically, the drive gear 63Y is provided with a rib part 75 shaped like a circle with the rotation axis as the center and a slit 77 is formed in one part of the rib part. The origin sensor 73 is an optical sensor of transmission type including a light emitting element and a light receiving element opposed to each other with the rib part 75 between. When any portion other than the slit 77 is positioned in the detection area of the origin sensor 73, light from the light emitting element is shielded and the light reception amount level in the light receiving element becomes comparatively low.

On the other hand, when the slit 77 is positioned in the detection area (when the rotation phase of the drive gear 63Y reaches the origin phase), light from the light emitting element is not shielded and thus the light reception amount level in the light receiving element becomes high. In the embodiment, the rotation phase of each photoconductor 31 when the origin sensor 73 enters a light entrance state is adopted as the origin phase. Upon reception of a detection signal Q output from the origin sensor 73 when entering the light entrance state (in the embodiment, the signal is designed in positive logic and high signal is indicated), the main control circuit 11 described later recognizes the timing at which the rotation phase of each drive gear 63 reaches the origin phase (which will be hereinafter referred to as "origin detection timing").

Since each drive gear 63 and the photoconductor 31 corresponding thereto rotate integrally on the same axis, as described above, it can be assumed that the rotation phase of the drive gear 63 and the rotation phase of the photoconductor 31 always match. Therefore, the origin sensor 73 indirectly detects whether or not the photoconductor 31 reaches the origin phase by detecting whether or not the drive gear 63 reaches the origin phase. Hereinafter, the drive gear 63 reaching the origin phase and the photoconductor 31 reaching the origin phase will be used in the same meaning in some cases.

(Main Control Circuit and LED Control Circuit)

Figure 3:
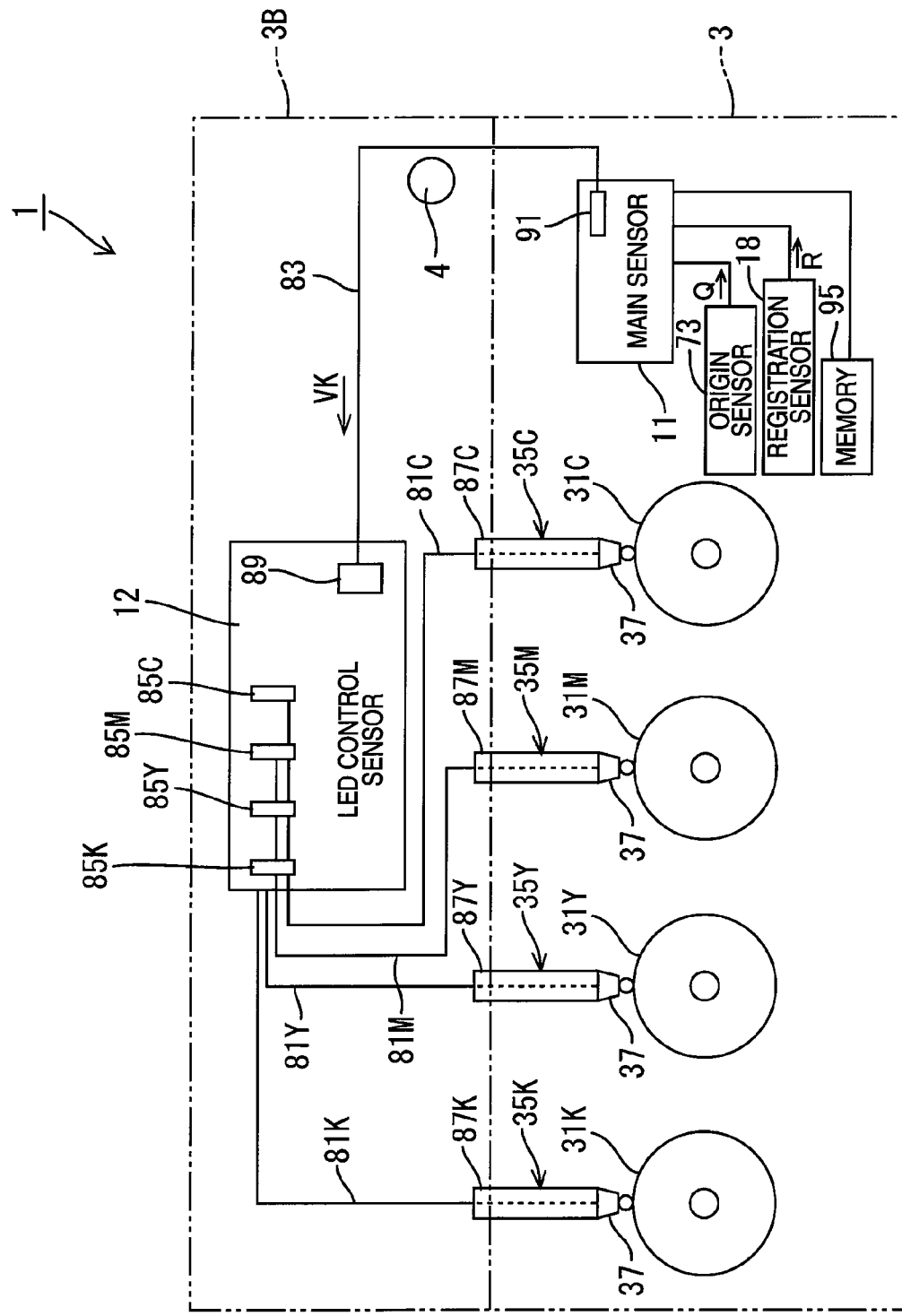
FIG. 3 is a schematic view illustrating a wiring structure of a main control circuit, an LED control circuit, and LED heads according to the first embodiment.

FIG. 3 is a schematic view illustrating a wiring structure of the main control circuit 11, the LED control circuit 12, and the LED heads 37.

The main control circuit 11 controls the units of the printer 1 at the image forming time. Specifically, it controls the rotation speed of the photoconductors 31 and the belt support rollers 27 and the conveying speed of the sheet 5 in the supply unit 7 and the fixing unit 25. The main control circuit 11 is connected to the origin sensor 73 and the registration sensor 18 and receives the detection signals Q and R. Control concerning exposure processing is described later in detail.

The LED control circuit 12 outputs a signal to each LED of each LED head 37 based on bit map data transmitted from the main control circuit 11 and controls light emission of the LEDs. The specific control is described later in detail. Each of the main control circuit 11 and the LED control circuit 12 is implemented as an ASIC (Application-Specific Integrated Circuit).

As shown in FIG. 3, the main control circuit 11 provided in the casing 3 and the LED control circuit 12 provided in the cover 3B are electrically connected by one flat cable 83. Four flat cables 81 are drawn from the LED control circuit 12 and are electrically connected to the LED units 35 (the LED heads 37).

Specifically, each LED unit 35 (each LED head 37) and the LED control circuit 12 are electrically connected by a flat cable 81 as a first signal line (81K, 81Y, 81M, 81C). The LED control circuit 12 and the main control circuit 11 are electrically connected by the one flat cable 83 as a second signal line.

Each of the flat cables 81 is a cable provided by tying a plurality of conductor wires each covered with an insulating resin film in a bundle like a belt and is connected at one end to a connector 85 (85K, 85Y, 85M, 85C) provided in the LED control circuit 12 and is connected at an opposite end to a connector 87 (87K, 87Y, 87M, 87C) provided on the top of the LED unit 35.

The flat cable 83 is a cable provided by tying a plurality of conductor wires each covered with an insulating resin film in a bundle like a belt. Although not shown, the total number of the conductor wires of the flat cable 83 is less than the total number of the conductor wires of the four flat cables 81. The flat cable 83 is connected at one end to a connector 89 provided in the LED control circuit 12 and is connected at an opposite end to a connector 91 provided in the main control circuit 11.

(Control Description Concerning Exposure Processing)

Figure 4:
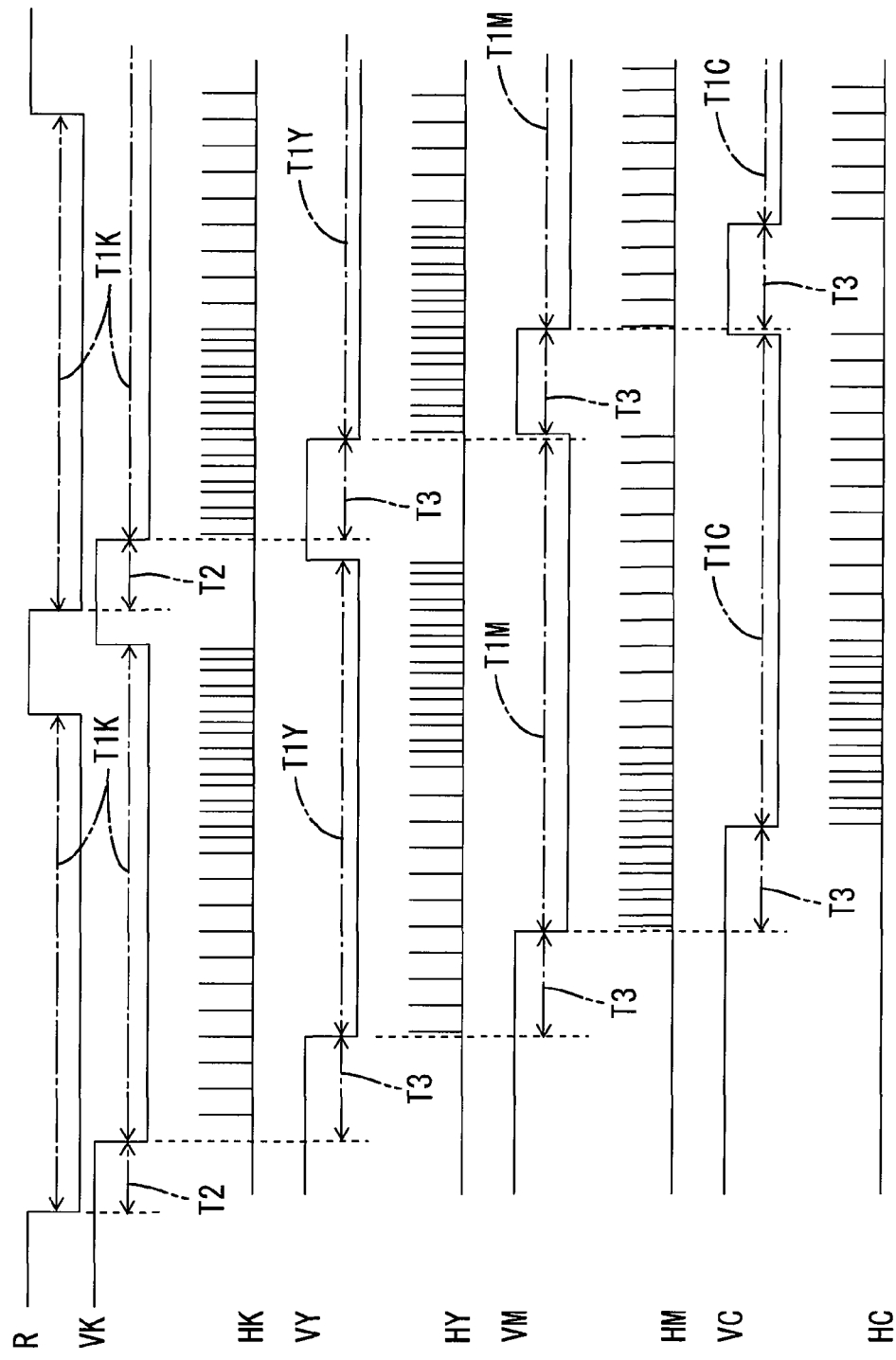
FIG. 4 is a time chart illustrating output timings of signals according to the first embodiment.

FIG. 4 is a time chart illustrating output timings of signals.

1. Main Control Circuit 11

The main control circuit 11 expands print data of the image to be formed (for example, print data received through a communication line from an external information processing apparatus (not shown), image data acquired from a document reader, etc.) into bit map data and transmits the bit map data to the LED control circuit 12.

The main control circuit 11 generates a first vertical synchronizing signal VK (in the embodiment, the signal is designed in negative logic and low signal is indicated in the time chart at the second stage of FIG. 4; an example of the first enabling signal) and transmits the signal to the LED control circuit 12. The first vertical synchronizing signal VK is a signal indicating an exposure enabling time period T1K [μs] for enabling the LED unit 35K to expose the photoconductor 31K (an example of the first photoconductor) in image formation processing on one sheet 5, for example.

The exposure enabling time period T1K (output duration of the first vertical synchronizing signal VK) is changed in response to the length of the sheet 5 conveyed from the sheet feed tray 13 in the sheet conveying direction X'. Specifically, as shown in FIG. 4, when the leading end of the sheet 5 passes through the detection area of the registration sensor 18, the registration sensor 18 starts to output the detection signal R and stops outputting the signal when the trailing end of the sheet 5 passes through the detection area. That is, the time during which the registration sensor 18 continues outputting the detection signal R is proportional to the length of the sheet 5 in the sheet conveying direction X'.

The main control circuit 11 outputs a signal provided by delaying the detection signal R by a predetermined time T2 [μs] as the first vertical synchronizing signal VK. The predetermined time T2 is determined by the distance between the position of the detection area of the registration sensor 18 and the transfer position FK of the photoconductor 31K, the conveying speed of the sheet 5, the setup range of a print area on the sheet 5, etc. Thus, the length of the sheet 5 in the sheet conveying direction X' is actually detected by the registration sensor 18 and the length of the exposure enabling time period T1K for the photoconductor 31K is changed, so that the length of the sheet 5 need not be preset.

2. LED Control Circuit

The LED control circuit 12 causes each LED unit 35 to execute the exposure processing for the image data line by line on each photoconductor 31 at exposure timing intervals in the exposure enabling time period T1 corresponding to each photoconductor 31.

Specifically, the LED control circuit 12 stores the bit map data received from the main control circuit 11 in a buffer which is not shown. The LED control circuit 12 reads the dot pattern data of each color contained in the bit map data line by line for each one-line dot pattern arranged in one direction (main scanning direction) (an example of the successive lines of the image data; a line of blank data forming no color image in the entire line is also contained), and performs the exposure processing in each one-line dot pattern (which will be hereinafter referred to simply as "one line" in some cases). The exposure processing refers to processing of outputting a signal based on the dot pattern to the LEDs of the LED head 37 and controlling light emission of the LEDs.

The LED control circuit 12 receives the first vertical synchronizing signal VK through the flat cable 83 from the main control circuit 11 and generates a second vertical synchronizing signal VY, VM, VC (an example of a second enabling signal) based on the first vertical synchronizing signal VK. The second vertical synchronizing signal VY, VM, VC (in the embodiment, each signal is designed in negative logic and low signal is indicated in the time chart at the fourth, sixth, eighth stage of FIG. 4) is a signal indicating an exposure enabling time period T1Y, T1M, T1C [μs] for enabling the LED unit 35Y, 35M, 35C to expose the photoconductor 31Y, 31M, 31C (examples of the second photoconductor) in the image formation processing on one sheet 5, for example. The generation timing and length change of each of the exposure enabling time periods T1Y, T1M, and T1C are described later in detail.

After the registration rollers 17 deliver the sheet 5, the LED control circuit 12 starts to generate a tentative horizontal synchronizing signal H' (H'K, H'Y, H'M, H'C) from the first origin detection timing of the origin sensor 73. The LED control circuit 12 generates a horizontal synchronizing signal H (HK, HY, HM, HC; in the embodiment, each signal is designed in positive logic and high signal is indicated in the time chart at the third, fifth, seventh, ninth stage of FIG. 4) synchronized with the tentative horizontal synchronizing signal H' corresponding to the color (in the embodiment, the signal is designed in positive logic) in the exposure enabling time period T1 for each color, and causes each LED unit 35 to execute the one-line exposure processing by adopting the rising edge of the horizontal synchronizing signal H as the exposure timing. This means that the horizontal synchronizing signal H is a signal for determining the exposure timing interval of the LED unit 35 of each color.

(1) Correction Processing of Exposure Timing Interval

As described above, each LED unit 35 performs one-line exposure processing of the photoconductors 31 in order at the exposure timing intervals in the exposure enabling time periods T1 corresponding to each photoconductor 31. Accordingly, a one-line electrostatic latent image is formed on the photoconductor 31 (hereinafter, the interval between the one-line electrostatic latent images on the photoconductor 31 (the position interval in the circumferential direction of the photoconductor 31) will be referred to as "exposure line interval"). The one-line electrostatic latent image is developed by the developing roller 49 and then is transferred to the sheet 5 at the transfer position F as a one-line toner image. Hereinafter, the interval between the one-line toner images on the sheet 5 (the position interval in the sheet conveying direction X') will be referred to as "transfer line interval (transfer position interval)."

The rotation speed (the rotation angle per unit time) of each photoconductor 31 (drive gear 63) periodically fluctuates due to eccentricity of the photoconductor 31, the drive gear 63, the drive mechanism 61, etc. To suppress variations in the transfer line interval caused by the periodical fluctuation, the LED control circuit 12 performs correction processing of the exposure timing interval. At this time, the LED control circuit 12 functions as a "correction unit."

Figure 5:
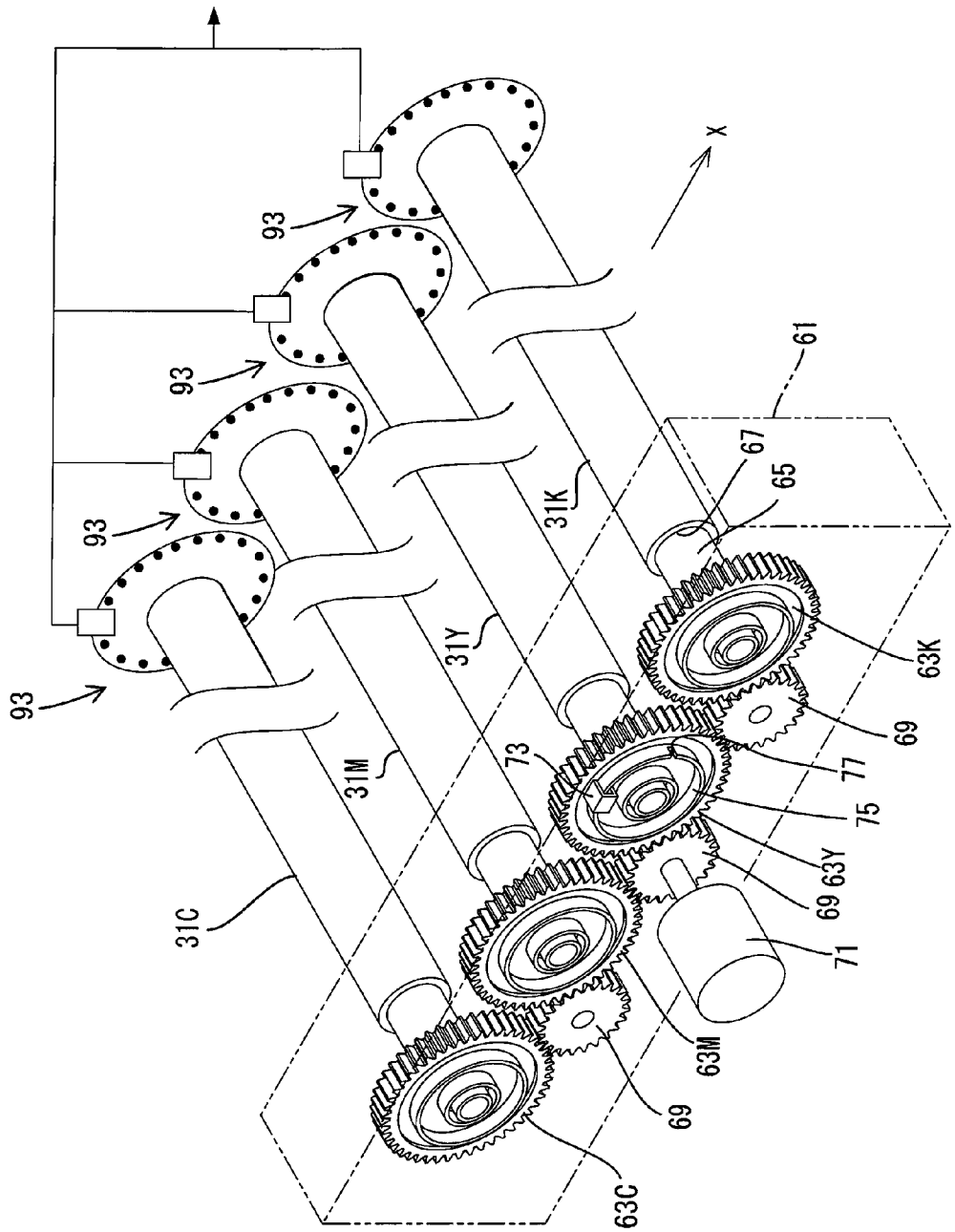
FIG. 5 is a schematic perspective view illustrating the drive mechanism with rotary encoders attached thereto.

Correction values used for the correction processing of the exposure timing interval will be discussed. The fluctuation characteristic of the rotation speed of each photoconductor 31 can be provided by actual measurement at the manufacturing stage of the printer 1, for example. Specifically, as shown in FIG. 5, a rotary encoder 93 is attached to one end of each photoconductor 31, the drive mechanism 61 is operated, and an encoder pulse signal output from each rotary encoder 93 and the detection signal Q from the origin sensor 73 are recorded in time series. The rotary encoder 93 is removed after the termination of the actual measurement. This means that the printer 1 after shipment does not include the rotary encoder 93.

Figure 6:
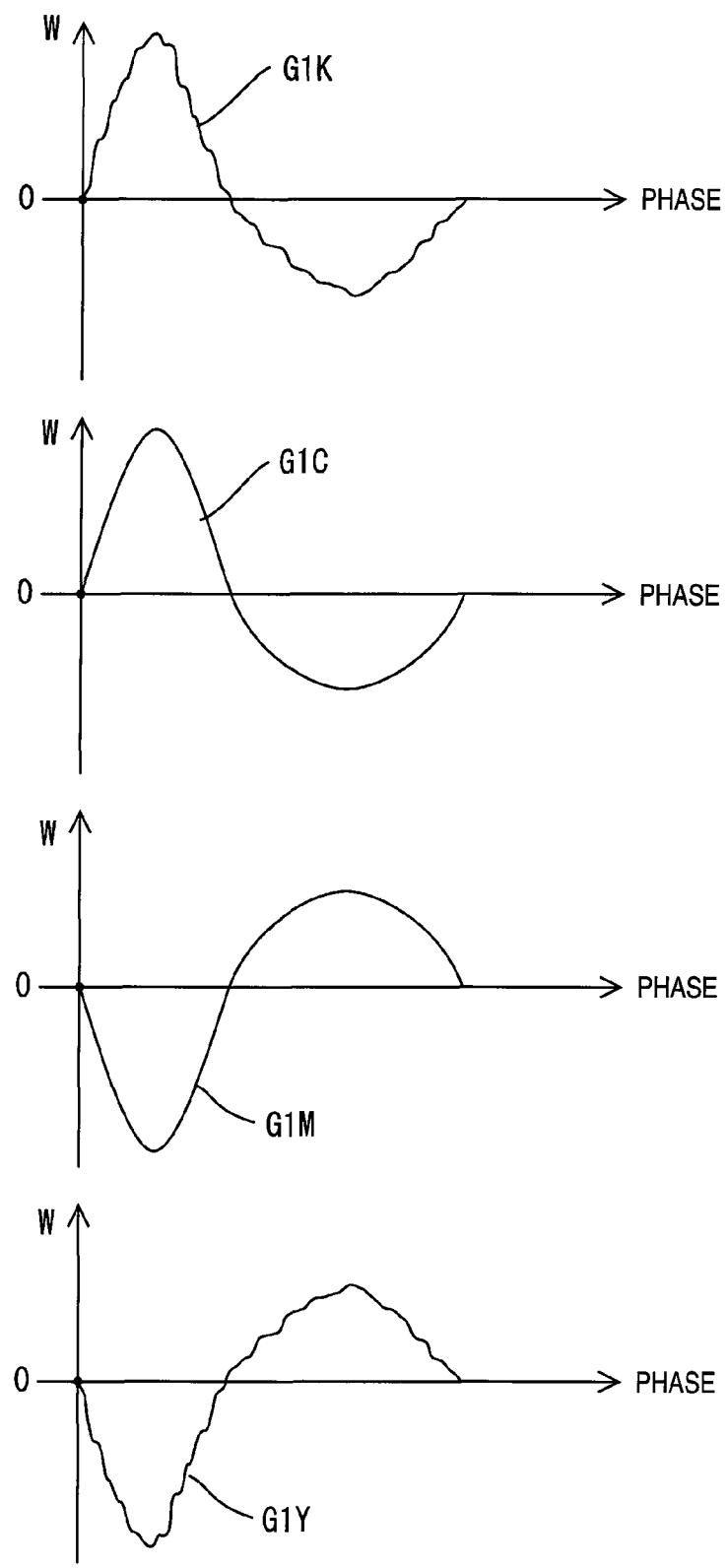
FIG. 6 is graphs showing change in pulse interval W in a one-revolution period in each drive gear according to the first embodiment.

A solid line G1 in FIG. 6 is a graph indicating change in pulse interval W [μs] of encoder pulse in the one-revolution period of each photoconductor 31 and shows the fluctuation characteristic of the rotation speed of each photoconductor 31. The vertical axis of the graph indicates the pulse interval W [μs] and the horizontal axis indicates the rotation phase (angle) of the one-revolution period with the origin phase as the top. Each pulse interval W is given the number N (1 to N') in order starting at the pulse interval W closest to the origin phase. For example, W(N) indicates the Nth pulse interval W counted from the origin phase.

FIG. 7 is a table listing the relationship between the pulse interval W [μs] and a correction value ΔJ [μs]. The leftmost column indicates the number N of pulse interval W data, the second column indicates the pulse interval W, and the third column indicates a post-corrected timing interval J [μs]. The "post-corrected timing interval J" refers to the exposure timing interval required for matching the transfer line interval roughly with a predetermined stipulated line interval. The "stipulated line interval" refers to the normal transfer line interval determined according to a print condition of resolution, etc. In the invention, the value of the stipulated line interval is set to Z0 [μm].

Next, a calculation method of the post-corrected timing interval will be discussed. Hereinafter, to simplify the description, the following conditions will be adopted as preconditions, but do not limit the scope of the invention:

(A) The four photoconductors 31 have the same diameter on design.

(B) The roughly 180-degree rotating position of every photoconductor 31 relative to the transfer position F is the exposure position D.

(C) The sheet 5 moves on the belt 29 at given speed between the transfer positions F; in the embodiment, it requires time W0 [μs] for the sheet 5 to move by distance (Z0) corresponding to the stipulated line interval, for example.

(D) The number of lines of dot patterns for which each LED unit 35 performs exposure processing in the one-revolution period of the photoconductor 31 is the same as the number N' of the pulse interval W of the encoder pulses in the one-revolution period of the photoconductor 31 (the number of pulses). The pulse interval W is the time required for the photoconductor 31 to rotate the distance (Z0) corresponding to the stipulated line interval at a time.

Figure 8:
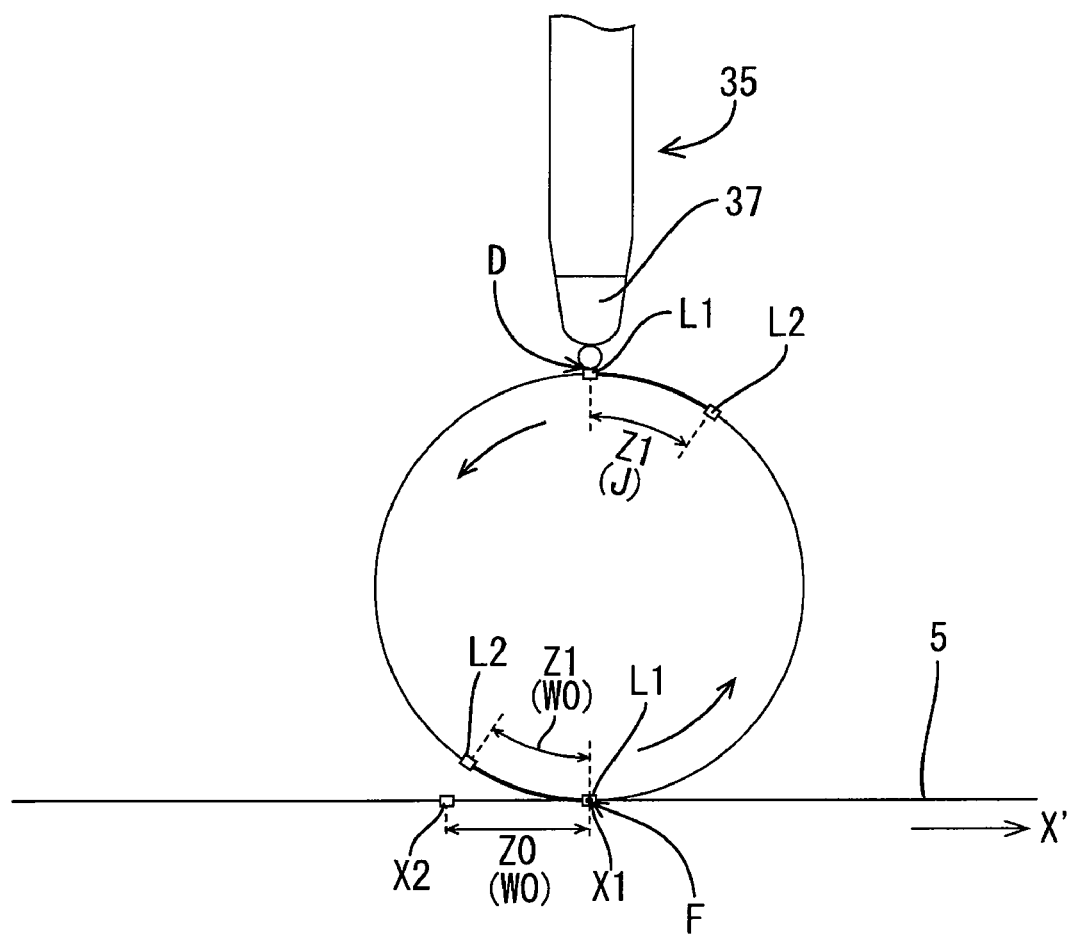
FIG. 8 is a schematic view illustrating a relationship between a rotation speed of a photoconductor and a moving speed of a sheet at the exposing time and the transferring time of dot patterns of any two lines according to the first embodiment.

FIG. 8 is a schematic view illustrating the relationship between the rotation speed of the photoconductor 31 and the moving speed of the sheet 5 at the exposing time and the transferring time of dot patterns of any two lines (in the figure, lines L1 and L2). It is assumed that the time required for the photoconductor 31 to rotate the circumference (Z0) corresponding to the stipulated line interval at the exposing time of the line L1, L2 is W1 [μs] and that the time required for the photoconductor 31 to rotate the circumference (Z0) corresponding to the stipulated line interval at the transferring time of the line L1, L2 is W2 [μs].

Conditions for transferring the toner images of the lines L1 and L2 to positions X1 and X2 at the distance of the stipulated line interval from each other on the sheet 5 will be discussed. First, the transferring time of the line L1, L2 will be discussed. When the position X1 on the sheet 5 arrives at the transfer position F, the toner image of the line L1 on the photoconductor 31 also arrives at the transfer position F and is transferred to the position X1. As described above, the sheet 5 moves the distance (Z0) corresponding to the stipulated line interval in the time W0 and thus the position X2 on the sheet 5 will arrive at the transfer position F after the passage of the time W0 from the point in time when the position X1 on the sheet 5 arrives at the transfer position F. Then, it is also necessary for the toner image of the line L2 to arrive at the transfer position F after the passage of the time W0 from the point in time when the toner image of the line L1 arrives at the transfer position F. Assuming that when the requirement is met, the exposure line interval between the toner images of the lines L1 and L2 on the photoconductor 31 is distance Z1 [μm], the distance Z1 can be found according to the following expression 1:

Distance $Z1$=[rotation speed of photoconductor 31 at the transferring time of line $L1, L2$]×time $W0$= $[Z0/W2] \times W0$      (Expression 1)

Next, the exposing time of the line L1, L2 will be discussed. The exposure timing interval between the lines L1 and L2 required for setting the exposure line interval between the lines L1 and L2 to the distance Z1, namely, the post-corrected timing interval J can be found according to the following expression:

Post-corrected timing interval $J$=distance $Z1$/[rotation speed of photoconductor 31 at the exposing time of line $L1, L2$]={$[Z0/W2] \times W0$}/{$Z0/W1$}=$W0 \times (W1/W2)$      (Expression 2)

Therefore, the post-corrected timing interval J (N) when the pulse interval W of the photoconductor 31 is the Nth pulse interval at the exposing time of any desired line can be found according to the following expression. Since the roughly 180-degree rotating position of each photoconductor 31 relative to the transfer position F is the exposure position D as described above, the "N+(N'/2)"nd pulse interval is used about the pulse interval at the transferring time.

Post-corrected timing interval $J(N)=W0 \times [W(N)/W(N+(N'/2))]$      (Expression 3)

Thus, the post-corrected timing interval J (N) can be found based on the rotation speed of the photoconductor at the exposing time and the rotation speed of the photoconductor at the transferring time.

The correction value ΔJ [N] in the embodiment is the difference between a predetermined reference timing interval J' (exposure timing interval required for setting the transfer line interval to the stipulated line interval when the photoconductor 31 rotates at constant speed determined on design) and the post-corrected timing interval J (N) as shown in the following expression:

Correction value $\Delta J[N]=J(N)-J'$      (Expression 4)

A correspondence table between the number N of the pulse interval W and the correction value ΔJ [N] is stored in memory 95.

The LED control circuit 12 reads the correction value ΔJ [1] corresponding to the number 1 of the pulse interval data at the origin detection timing of the origin sensor 73, and generates a first tentative horizontal synchronizing signal H' at the passage of the time corresponding to the post-corrected timing interval J (1) (=J'+ΔJ (1)) from the origin detection timing. Next, the LED control circuit 12 generates a second tentative horizontal synchronizing signal H' at the passage of the time corresponding to the post-corrected timing interval 3 (2) (=J'+ΔJ (21)) from the point in time. Likewise, the LED control circuit 12 generates third and later tentative horizontal synchronizing signals H' in order at the post-corrected timing interval J (N) and repeats the same processing starting at the first again after generating the tentative horizontal synchronizing signal H' at the N'th post-corrected timing interval J (N').

The LED control circuit 12 generates a horizontal synchronizing signal H synchronized with the tentative horizontal synchronizing signal H' in the exposure enabling time period T1 for each color, and causes each LED unit 35 to execute the one-line exposure processing by adopting the signal generating timing as the exposure timing. That is, the LED control circuit 12 corrects the exposure timing interval whenever necessary based on the correspondence table to suppress the discrepancy between the transfer line interval and the stipulated line interval for each line.

(2) Change Processing of Exposure Enabling Time Period

The LED control circuit 12 corrects the exposure timing interval for each photoconductor 31 as described above. Assuming that the exposure enabling time period T1 for every photoconductor 31 is set to a uniform time T1' [μs], the number of lines of the dot patterns subjected to exposure processing within the time T1' may vary from one photoconductor 31 to another.

For example, assume that each photoconductor 31 rotates to a midpoint at the Uth (where U is a natural number) revolution within the time T1'. The fluctuation characteristic of the rotation speed varies from one photoconductor 31 to another as described above. Thus, the exposure timing interval of the photoconductor 31K may be corrected so as to become shorter than the reference timing interval J' from the start of the Uth revolution of the photoconductor 31K to the expiration of the time T1'; while, the exposure timing interval of the photoconductor 31Y may be corrected so as to become longer than the reference timing interval J' from the start of the Uth revolution of the photoconductor 31Y to the expiration of the time T1'. Consequently, the number of lines of the dot patterns subjected to exposure processing within the time T1' for the photoconductor 31Y becomes small as compared with that for the photoconductor 31K. Accordingly, the image quality may deteriorate in such a manner that the color image of one page formed on the sheet 5 has a partial color image cut at a midpoint on the current page or also contains an image of the next page.

Then, to suppress deterioration of the image quality caused by the difference in the number of lines, the LED control circuit 12 performs the change processing of the exposure enabling time period T1. Specifically, the LED control circuit 12 changes the lengths of the exposure enabling time periods T1Y, T1M, and T1C corresponding to the downstream photoconductors 31Y, 31M, and 31C so that the photoconductor 31K and the downstream photoconductors 31Y, 31M, and 31C match in the number of lines subjected to exposure processing within each of the exposure enabling time periods T1K, T1Y, T1M, and T1C (which will be hereinafter referred to as "total number of lines." Specifically, the number of tentative horizontal synchronizing signals H' generated within each the exposure enabling time period T1). At this time, the LED control circuit 12 functions as a "change unit."

Figure 9:
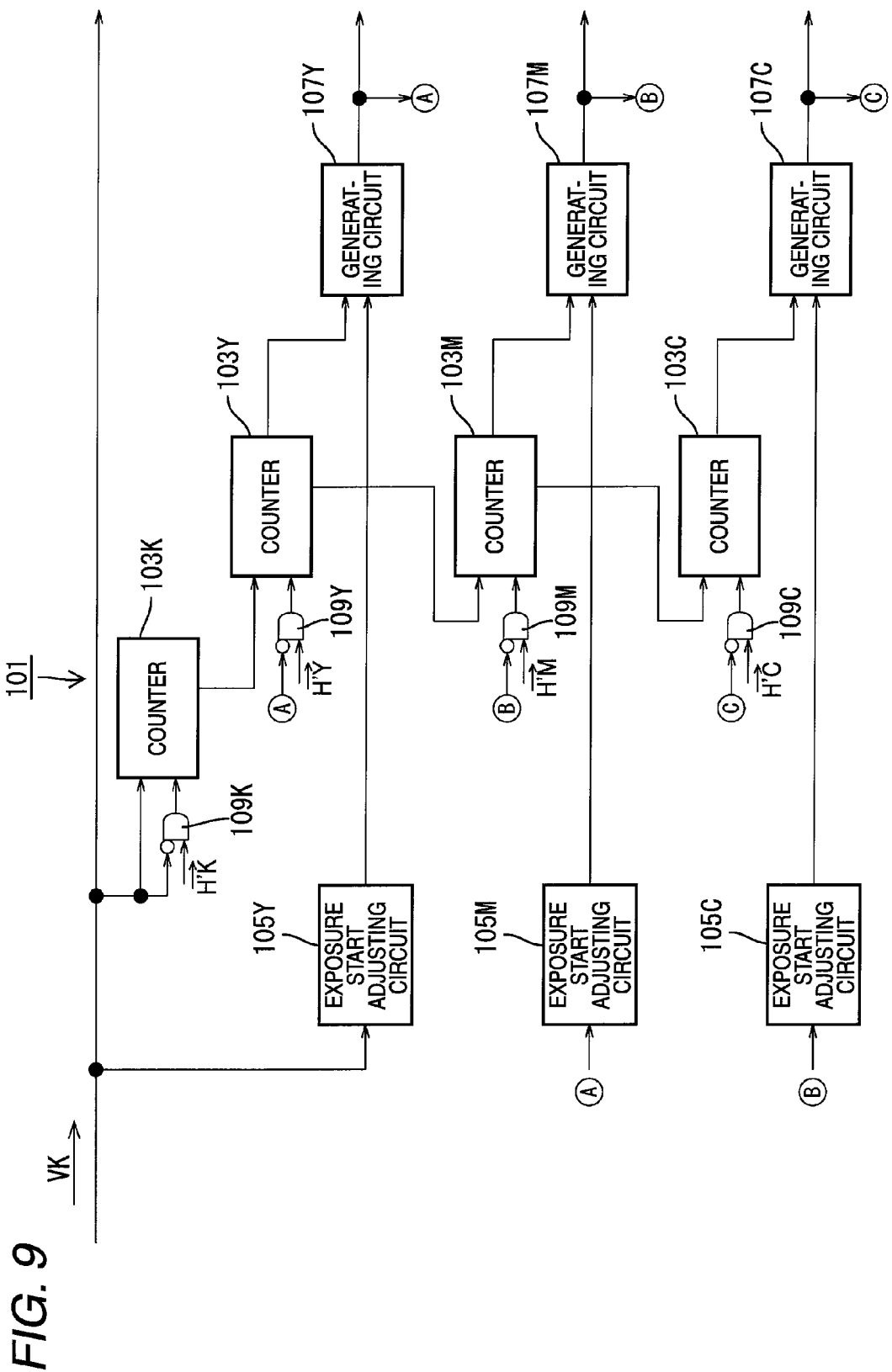
FIG. 9 is a schematic diagram of a change circuit according to the first embodiment.

FIG. 9 is a schematic diagram of a change circuit 101 installed on the LED control circuit 12 for implementing the change processing. The change circuit 101 includes four counters 103 (103K, 103Y, 103M, and 103C) provided in a one-to-one correspondence with the four photoconductors 31. The change circuit 101 also includes three exposure start adjusting circuits 105 (105Y, 105M, and 105C) and three generating circuits 107 (107Y, 107M, and 107C) provided in a one-to-one correspondence with the three photoconductors 31Y, 31M, and 31C.

(A) Line Count of Black Image

The vertical synchronizing signal VK from the main control circuit 11 is input to the counter 103K. The tentative horizontal synchronizing signal H'K is also input to the counter 103K by an AND circuit 109K only if the vertical synchronizing signal VK is input.

Figure 10:
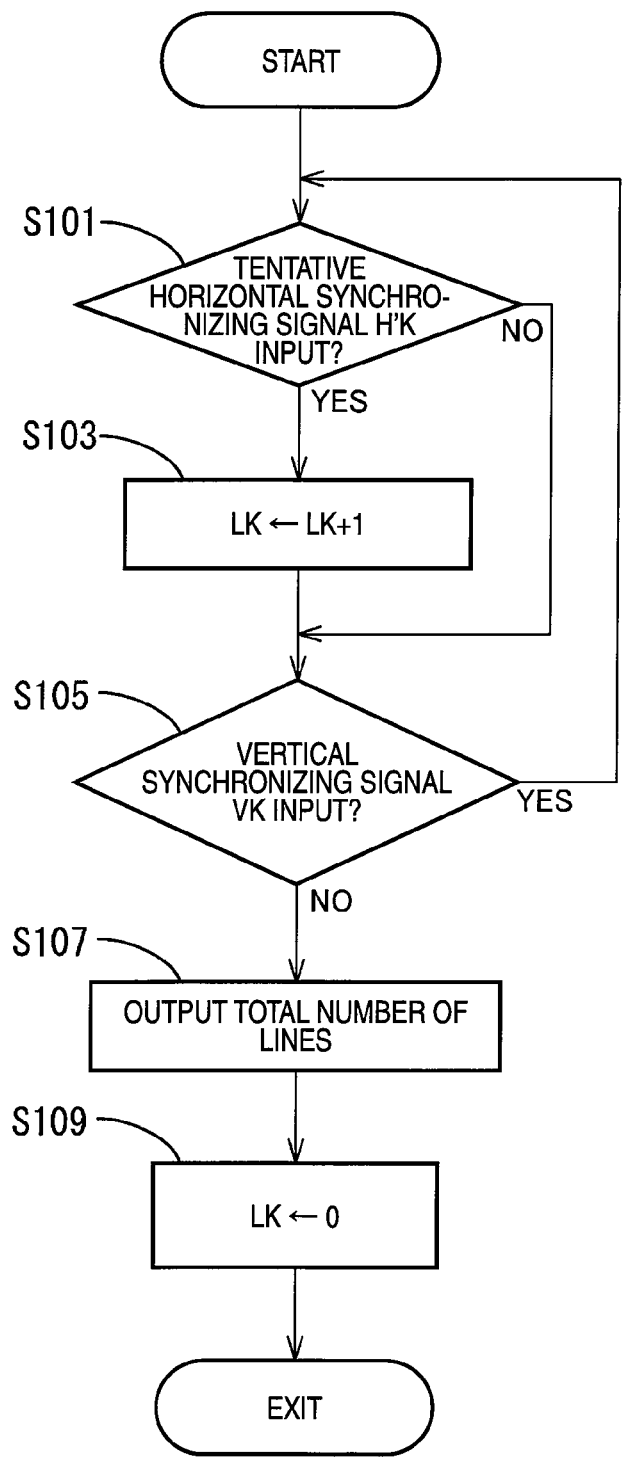
FIG. 10 is a flowchart illustrating count processing of a counter for black.

When the start of the exposure enabling time period T1K comes and the vertical synchronizing signal VK is input, the counter 103K executes processing shown in FIG. 10. First, at S101, whether or not the tentative horizontal synchronizing signal H'K is input from the AND circuit 109K is determined. If it is determined that the tentative horizontal synchronizing signal H'K is input (YES at S101), one is added to line count LK at S103. Likewise, whenever the tentative horizontal synchronizing signal H'K is input, one is added to line count LK so long as the determination at S105 is YES.

When the vertical synchronizing signal VK is not input (NO at S105), the processing is terminated and the final line count LK is passed to the following counter 103Y as the total number of lines of the black image (which will be hereinafter referred to as "total number of black lines" (S107). At S109, the line count LK is reset to zero. In the LED control circuit 12, a generating circuit not shown generates a horizontal synchronizing signal HK synchronized with the tentative horizontal synchronizing signal H'K only within the exposure enabling time period T1K.

(B) Line Count of Yellow Image, Magenta Image, Cyan Image

The exposure start adjusting circuits 105Y, 105M, and 105C are circuits for adjusting the exposure start timings of the photoconductors 31Y, 31M, and 31C corresponding to the exposure start adjusting circuits 105Y, 105M, and 105C (the starts of the exposure enabling time periods T1Y, T1M, and T1C). Specifically, the exposure start adjusting circuit 105Y (105M, 105C) receives the vertical synchronizing signal VK (VY, VM) for determining the exposure enabling time period T1K (T1Y, T1M) of the photoconductor 31K (31Y, 31M) just upstream from the photoconductor 31Y (31M, 31C) corresponding to the exposure start adjusting circuit 105Y (105M, 105C) and delays the signal by a predetermined time T3 [μs] for output. The predetermined time T3 is the time responsive to the distance between the transfer positions F of the photoconductor 31Y (31M, 31C) corresponding to the exposure start adjusting circuit 105Y (105M, 105C) and the photoconductor 31K (31Y, 31M) just upstream from the photoconductor 31Y (31M, 31C).

The counter 103Y (103M, 103C) receives the total number of black lines in the black counter 103K from the counter 103K (103Y, 103M) corresponding to the photoconductor 31K (31Y, 31M) just upstream from the photoconductor 31Y (31M, 31C) corresponding to the counter 103Y (103M, 103C). The above-described tentative horizontal synchronizing signal H'Y, (H'M, H'C) is input to the counter 103Y (103M, 103C) by an AND circuit 109Y (109M, 109C) only if the vertical synchronizing signal VY (VM, VC) from the generating circuit 107Y (107M, 107C) described later is input.

Figure 11:
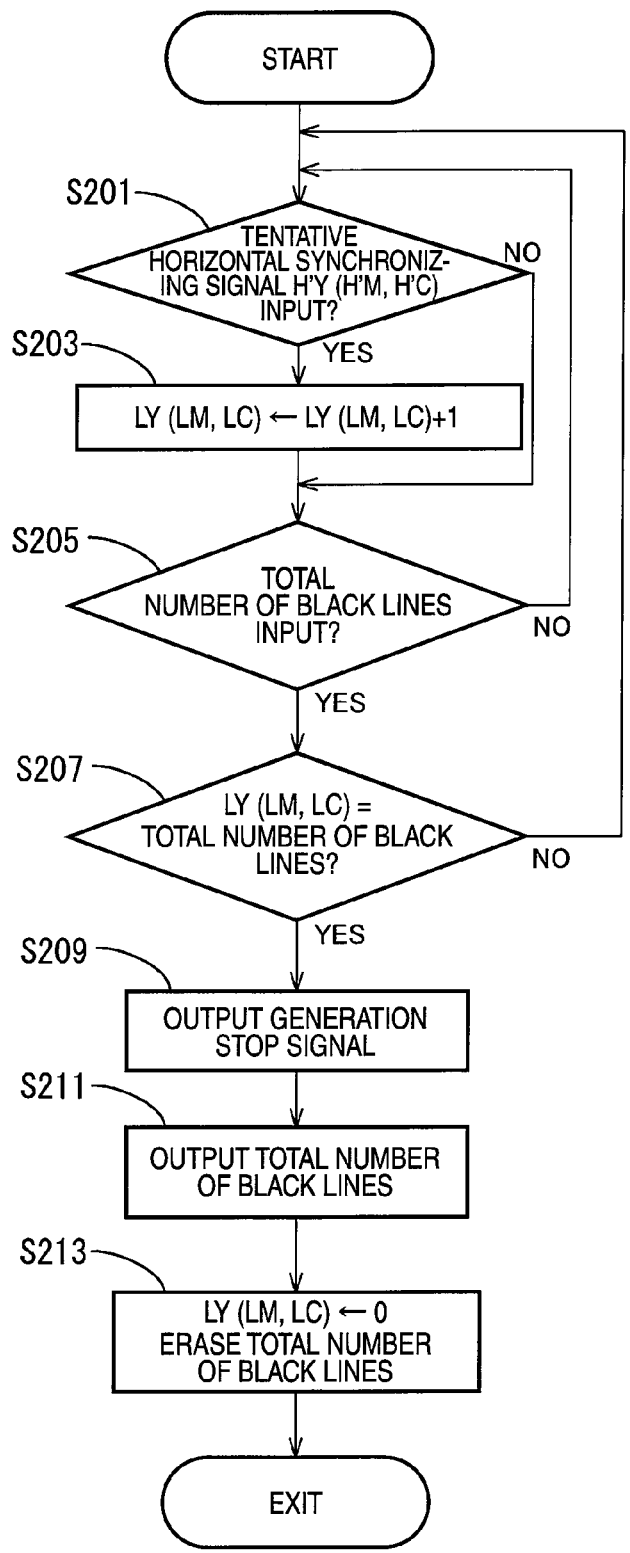
FIG. 11 is a flowchart illustrating count processing of a counter for yellow (magenta, cyan)

When the tentative horizontal synchronizing signal H'Y, (H'M, H'C) is input to the counter 103Y (103M, 103C) from the AND circuit 109Y (109M, 109C), the counter 103Y (103M, 103C) executes count processing shown in FIG. 11. First, at S201, whether or not the tentative horizontal synchronizing signal H'Y (H'M, H'C) is input from the AND circuit 109Y (109M, 109C) is determined. If it is determined that the tentative horizontal synchronizing signal H'Y (H'M, H'C) is input (YES at S201), one is added to line count LY (LM, LC) at S203.

Next, S205, whether or not the total number of black lines is input from the counter 103K (103Y, 103M) is determined. If the total number of black lines is not input (NO at S205), the process returns to S201; if the total number of black lines is input (YES at S205), whether or not the current line count LY (LM, LC) reaches the total number of black lines is determined at S207. If the current line count LY (LM, LC) does not reach the total black line count (NO at S207), the process returns to S201; if the current line count LY (LM, LC) reaches the total number of black lines (YES at S207), a generation stop signal is output to the generating circuit 107Y (107M, 107C) at S209 and the total number of black lines is passed to the counter 103M (103C) corresponding to the downstream photoconductor 31M (31C) at S211. At S213, the line count is reset to zero and the total number of black lines is erased for restoring to the initial state. Here, the counter 103C of the downstream photoconductor 31C does not pass the total number of black lines at S211.

Upon input of the vertical synchronizing signal VK (VY, VM) delayed by the predetermined time T3 [μs] and output from the exposure start adjusting circuit 105Y (105M, 105C), the generating circuit 107Y (107M, 107C) starts to output the vertical synchronizing signal VY (VM, VC). Upon reception of the generation stop signal from the counter 103Y (103M, 103C), the generating circuit 107Y (107M, 107C) stops outputting the vertical synchronizing signal VY (VM, VC). The vertical synchronizing signal VY (VM, VC) is input to the AND circuit 109Y (109M, 109C).

According to the described configuration, as shown in FIG. 4, the counter 103Y (103M, 103C) performs count processing of starting to count the number of times the tentative horizontal synchronizing signal H'Y (H'M, H'C) has been input, in other words, the number of lines of the dot patterns subjected to exposure processing from the start of the exposure enabling time period T1Y (T1M, T1C) and terminating the exposure enabling time period T1Y (T1M, T1C) if the line count LY (LM, LC) matches the total number of black lines. Accordingly, the total numbers of lines of all color images can be matched with each other.

ADVANTAGES OF THE EMBODIMENT

According to the embodiment, the lengths of the exposure enabling time periods T1Y, T1M, and T1C corresponding to the photoconductors 31Y, 31M, and 31C can be changed. Therefore, a color image can be generated on the sheet 5 by the upstream photoconductor 31K for a black image and the photoconductors 31Y, 31M, and 31C for other color images, while transferring the same total number of lines between the photoconductors 31. That is, deterioration of the image quality caused by the fact that the total number of lines (in other words, the total number of one-line visible images transferred to the predetermined area on a transfer medium) varies from one photoconductor 31 to another because of rotation speed fluctuation of the photoconductor 31 can be suppressed.

(2) The LED control circuit 12 includes the counters 103Y, 103M, and 103C and the counter 103Y (103M, 103C) performs the count processing for terminating the exposure enabling time period T1Y (T1M, T1C) based on the line count. The length of the exposure enabling time period T1Y (T1M, T1C) is thus changed based on the line count, so that a composite color image with color images matching in the total number of lines can be transferred from all the photoconductors 31 to the sheet 5 comparatively easily and precisely.

(3) The aspect of the invention also contains, for example, a configuration wherein the total number of black lines is stored in the common memory 95 and each of the counters 103Y, 103M, and 103C accesses the memory 95 individually. In this configuration, however, a conflict may occur between accessing of each counter and updating of the total number of black lines, and control for avoiding the conflict becomes necessary. In contrast, according to the embodiment, the total number of black lines is passed serially among the counters 103Y, 103M, and 103C, so that occurrence of a conflict between accessing of each of the counters 103Y, 103M, and 103C and updating of the total number of black lines can be prevented.

(4) The aspect of the invention also contains, for example, a configuration wherein the total number of black lines is passed at the same timing among the counters 103Y, 103M, and 103C. In the configuration, however, control for each counter 103 to determine what time the passed total number of black lines should be updated for use from becomes necessary. For example, if the total number of black lines is passed to the counters 103Y, 103M, and 103C at a stroke at the expiration of the exposure enabling time period T1K, if the sheet 5 is very short, when the upstream LED unit 35K forms an image of the third page on the third sheet 5, a situation in which the downstream LED unit 35C forms an image of the first page on the first sheet 5 can occur. Then, it is feared that the total number of black lines to be used for exposure processing of the third page may be used in the LED unit 35C for performing exposure processing of the first page. To prevent this, it is also possible to provide control for reading data starting at old data using FIFO (first-in, first-out), etc., but the circuitry becomes complicated.

In contrast, according to the embodiment, at the expiration of the exposure enabling time period T1Y (T1M, T1C) of the photoconductor 31Y (31M, 31C) corresponding to the counter 103Y (103M, 103C), the counter 103Y (103M, 103C) passes the total number of black lines to the counter 103M (103C) corresponding to the photoconductor 31M (31C) downstream from the photoconductor 31Y (31M, 31C). Thus, after the total number of black lines is passed, the counter 103Y (103M, 103C) needs only to use the total number of black lines to terminate the exposure enabling time period T1Y (T1M, T1C) (see S205 in FIG. 11), and the above-mentioned control becomes unnecessary.

(5) For example, to form an image not using some color of the four colors (for example, a monochrome image) on the sheet 5, exposure is not required for the photoconductor 31 of the unused color and essentially the above-mentioned count processing need not be performed. In the embodiment, however, all counters 103 are caused to execute count processing regardless of whether or not exposure processing of the photoconductor 31 is required. Accordingly, the length of the exposure enabling time period T1 can always be changed in the same processing regardless of whether or not exposure processing of each photoconductor 31 is required.

(6) According to the embodiment, the main control circuit 11 is placed in the casing 3 and the LED control circuit 12 is placed below the cover 3B like the LED units (see FIG. 1). Assuming that the main control circuit 11 generates vertical synchronizing signals V corresponding to all photoconductors 31, signal lines for transmitting all the vertical synchronizing signals V become necessary between the main control circuit 11 and the LED control circuit 12 and wiring becomes complicated. Since the distance between the main control circuit 11 and the LED control circuit 12 is prolonged, the effect of noise is easily received.

In contrast, in the embodiment, the main control circuit 11 generates only the vertical synchronizing signal VK indicating the exposure enabling time period T1K corresponding to the photoconductor 31K, and the LED control circuit 12 generates the vertical synchronizing signals VY, VM, and VC indicating the exposure enabling time periods T1Y, T1M, and T1C corresponding to the downstream photoconductors 31Y, 31M, and 31C. According this configuration, the wiring of the main control circuit 11 and the LED control circuit 12 can be simplified and the effect of noise can be suppressed.

(7) In the tandem image forming apparatus like the printer 1 of the embodiment, the photoconductors 31 easily differ in the total number of black lines because of the difference in the rotation speed fluctuation characteristic between the photoconductors 31 and thus the significance of applying the invention is particularly large.

Second Embodiment

Figure 13:
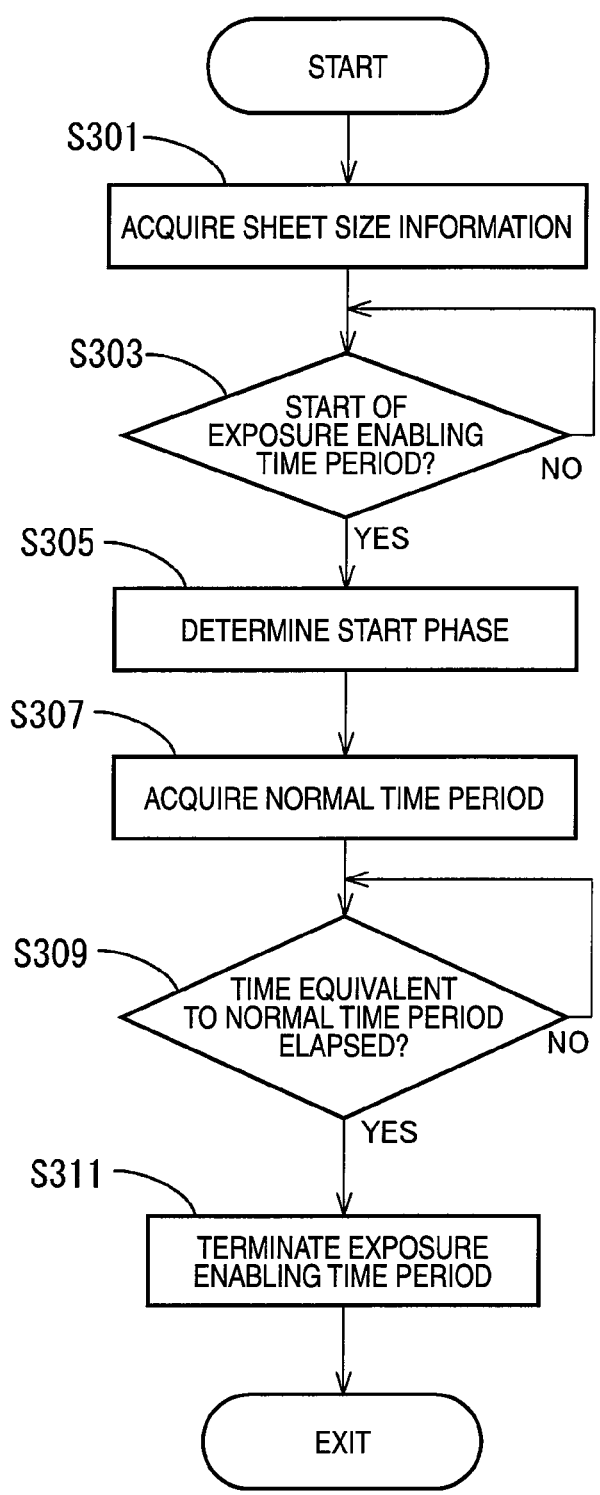
FIG. 13 is a flowchart illustrating processing of an LED control circuit according to the second embodiment.

FIGS. 12 and 13 show a second embodiment of the invention. The second embodiment differs from the first embodiment only in change processing of exposure enabling time periods T1Y, T1M, and T1C. Therefore, parts identical with or similar to those of the first embodiment are denoted by the same reference numerals in the second embodiment and will not be discussed again. In the description to follow, it is assumed that the total number of black lines is a predetermined fixed value.

A printer 1 does not include a synchronizing mechanism adapted to always start rotation of each drive gear 63 at the same rotation phase at the feeding start timing of a sheet 5. Therefore, the rotation phase of each photoconductor 31 at the start of each exposure enabling time period T1 (which will be hereinafter referred to as "start phase") is indeterminate and varies each time an image is formed on one sheet 5. If the start phase varies, the number of lines of dot patterns subjected to exposure processing within the same time period T1' [μs] can also vary. However, if the start phase of each of the downstream photoconductors 31Y, 31M, and 31C is determined, the normal time period of the exposure enabling time period for matching the total number of lines with the total number of black lines.

Then, in the second embodiment, an LED control circuit 12 determines each start phase based on the elapsed time from the origin detection timing of an origin sensor 73 to the start of the exposure enabling time period T1Y (T1M, T1C) (in a predetermined time T3 [μs] after the start of the exposure enabling time period T1K (T1Y, T1M) for the just upstream photoconductor 31K (31Y, 31M) as in the first embodiment). At this time, the LED control circuit 12 and the origin sensor 73 function as a "determination unit."

Memory 95 stores a correspondence table (an example of "correspondence information") among sheet sizes A, B, C . . . of the sheet 5 (for example, A4 size, letter size, B5 size, A5 size, etc.,), rotation phases of one cycle, and normal time period for each of the downstream photoconductors 31Y, 31M, and 31C, as shown in FIG. 12. The "normal time period" is the exposure enabling time period [μs] with the total number of lines matching the total number of black lines when each rotation phase is determined the start phase. The "correspondence information" is not limited to the correspondence table and may be a relational expression between the rotation phase and the normal time period.

For example, whenever a sheet feed command of one sheet 5 is given or a registration sensor 18 detects the leading end of the sheet 5, the LED control circuit 12 executes processing shown in FIG. 13. First, at S301, sheet size information (sheet size A, B, C . . . ) is acquired from print condition information added to print data, setting information entered through an operation unit (not shown), etc. When the start of the exposure enabling time period T1Y (T1M, T1C) comes (YES at S303), the start phase at the time is determined (S305).

Next, at S307, the normal time period corresponding to the acquired sheet size information and the start phase is acquired from the correspondence table. When the time equivalent to the normal time period has elapsed since the arrival time of the start of the exposure enabling time period T1Y (T1M, T1C) (YES at S309), the exposure enabling time period T1Y (T1M, T1C) is terminated (S311). Accordingly, the exposure enabling time period T1Y (T1M, T1C) is changed to the same time length as the normal time period, whereby the total number of lines can be matched with the total number of black lines.

According to the described configuration, deterioration of the image quality caused by rotation speed fluctuation of the photoconductor can be suppressed without providing any counter 103, etc.

Other Embodiments

While the present invention has been shown and described with reference to certain exemplary embodiments thereof, it will be understood by those skilled in the art that various changes in form and details may be made therein without departing from the spirit and scope of the invention as defined by the appended claims.

In the embodiments described above, the exposure enabling time periods T1 of all photoconductors 31Y, 31M, and 31C (downstream photoconductors) other than the upstream photoconductor are changed, but the invention is not limited to the mode. The exposure enabling time period T1 of at least one of the photoconductors 31 may be changed. For example, change processing of the exposure enabling time period T1 may be skipped for a comparatively inconspicuous yellow image. In the embodiments described above, the number of the photoconductors 31 is four, but is not limited to four and may be any other number of two or more. In the embodiment described above, one photoconductor and other photoconductors are matched in the total number of lines, but need not necessarily be matched in the total number of lines; the difference in the total number of lines can be suppressed within the range in which the image quality is not affected.

(2) In the embodiments described above, "one photoconductor" is the upstream photoconductor 31K, but is not limited to it. It may be the photoconductor 31Y, 31M, etc., and the photoconductor 31Y, 31M, etc., and the photoconductors downstream from the photoconductor 31Y, 31M, etc., may be matched in the total number of lines.

(3) The exposure unit includes the LEDs (light emitting diodes), but the invention is not limited to it. For example, the exposure unit may have an array of a large number of light emitting elements of EL (electroluminescence) elements, fluorophors, etc., for selectively causing the light emitting elements to emit light in response to image data or may have an array of optical shutters made of liquid crystal elements, PLZT, etc., for selectively controlling the opening-closing time of the optical shutters in response to image data, thereby controlling the light from the light source. It may be an exposure unit of any other electrophotography system such as a laser system for exposing to laser light.

(4) In the embodiments described above, the exposure timing interval is corrected so as to suppress transfer line interval variations caused by rotation speed fluctuation of the photoconductor 31. However, the transfer line interval variations may be caused by short-term speed fluctuation of the photoconductor 31 or speed fluctuation of any other rotation body involved in exposure and transfer such as the conveying belt 29 as well as the periodical speed fluctuation of the photoconductor 31. Known arts for correcting the exposure timing interval in response to the speed fluctuation are available. The invention is applied to an image forming apparatus using any of such known arts, whereby deterioration of the image quality caused by the fact that the photoconductors 31 differ in the total number of black lines can be suppressed.

(5) In the first embodiment described above, the length of the sheet 5 in the sheet conveying direction X' is detected and the length of the exposure enabling time period T1K for the photoconductor 31K is changed in response to the detection result, but the invention is not limited to the mode. For example, the length, margin width, etc., of the sheet 5 may be determined from a preset print condition and the length of the exposure enabling time period T1K may be changed in response to the determination result.

Further, in the first embodiment described above, the total number of black lines is counted each time, but total number data of black lines predetermined in response to the length of the sheet 5, for example, may be read from the memory 95 without counting the total number of black lines. However, the printer 1 of the embodiment does not include a synchronizing mechanism adapted to always start rotation of each drive gear 63 at the same rotation phase at the feeding start timing of the sheet 5. Thus, to form an image on the sheet 5 of the same length, the rotation phase at the start of the exposure enabling time period T1K may vary and consequently the total number of black lines may differ. Thus, the configuration of the first embodiment is preferred.

(7) In the description of the second embodiment described above, the total number of black lines is a fixed value. However, for the photoconductor 31K for a black image, like other photoconductors, the correspondence information may be stored in the memory and the length of the exposure enabling time period T1K may be changed so that the total number of lines becomes the fixed value based on the correspondence information.

(8) In the embodiments described above, the "transfer medium" is the sheet 5, but may be an intermediate transfer body (such as an intermediate transfer belt) in an image forming apparatus of an intermediate transfer system.

The present invention can be implemented in illustrative non-limiting aspects as follows:

(1) In a first aspect, there is provided an image forming apparatus comprising: a first photoconductor; a second photoconductor disposed at a downstream side of the first photoconductor in a moving direction of a medium; a first exposure unit which is configured to form a first electrostatic latent image on the first photoconductor line by line at first exposure timing intervals in a first exposure enabling time period based on successive lines of first image data; a second exposure unit which is configured to form a second electrostatic latent image on the second photoconductor line by line at second exposure timing intervals in a second exposure enabling time period based on successive lines of second image data; a correction unit which is configured to correct at least one of the first exposure timing intervals so as to adjust first transfer position intervals between successive lines of a first visible image provided by developing the first electrostatic latent image and the second exposure timing intervals so as to adjust second transfer position intervals between successive lines of a second visible image provided by developing the second electrostatic latent image; and a change unit which is configured to change the second exposure enabling time period so as to suppress a difference between the number of the successive lines of the first image data for forming the first electrostatic latent image on the first photoconductor in the first exposure enabling time period and the number of the successive lines of the second image data for forming the second electrostatic latent image on the second photoconductor in the second exposure enabling time period.

With this configuration, the length of the second exposure enabling time period can be changed. Therefore, the difference in the number of successive lines between the first photoconductor and the second photoconductor can be suppressed and images with roughly the same number of lines can be transferred from the first photoconductor and the second photoconductor to the medium. That is, deterioration of the image quality caused by the difference between the number of successive lines of the one color first visible image and the number of successive lines of another color second visible image can be suppressed.

(2) According to a second aspect, there is provided the image forming apparatus according to the first aspect, further comprising a driving unit which is configured to rotate at least one of the first photoconductor and the second photoconductor, wherein the correction unit corrects at least one of the first exposure timing intervals in response to rotation speed fluctuation of the first photoconductor and the second exposure timing intervals in response to rotation speed fluctuation of the second photoconductor.

In the image forming apparatus including a plurality of photoconductors arranged along the moving direction of a transfer medium, the number of lines of one photoconductor likely differs from that of another photoconductor due to the difference in the rotation speed fluctuation characteristics between the photoconductors and thus the significance of applying the invention is particularly large.

(3) According to a third aspect, there is provided the image forming apparatus according to the first aspect or the second aspect, wherein the change unit starts counting the number of the successive lines of the second image data when the second exposure enabling time period is started; and wherein the change unit terminates the second exposure enabling time period when the difference between the number of the successive lines of the first image data and the number of the successive lines of the second image data falls within a range.

Based on the number of lines of the first image data subjected to exposure processing for the first photoconductor, the length of the second exposure enabling time period corresponding to the second photoconductor is changed, so that images with the same number of lines can be transferred from the first photoconductor and the second photoconductor to the medium.

(4) According to a fourth aspect, there is provided the image forming apparatus according to the third aspect, further comprising a detection unit which is configured to detect the length of the medium in the moving direction, wherein the change unit changes the first exposure enabling time period based on the detected length.

The length of the medium in the moving direction is actually detected by the detection unit and the length of the first exposure enabling time period for the first photoconductor is changed. Therefore, it is not necessary to preset the length of the medium.

(5) According to a fifth aspect, there is provided the image forming apparatus according to the third aspect or the fourth aspect, wherein the change unit has a first counter which is configured to count the number of the successive lines of the first image data and a second counter which is configured to count the number of the successive lines of the second image data; and wherein the first counter transmits the number of the successive lines of the first image data to the second counter.

The first aspect also contains, for example, a configuration wherein the number of lines of the first photoconductor is stored in common memory 95 and each of the counters accesses the common memory 95 individually. In this configuration, however, a conflict may occur between accessing of each counter and updating of the number of the lines of the first photoconductor, and a special control for avoiding the conflict becomes necessary. In contrast, according to the fifth aspect, the number of lines of the first photoconductor is transmitted from the first counter to the second counter, so that occurrence of the conflict between accessing from each of the counters and updating of the number of lines can be suppressed.

(6) According to a sixth aspect, there is provided the image forming apparatus according to the fifth aspect, wherein the first counter transmits the number of the successive lines of the first image data to the second counter when the first exposure enabling time period is terminated.

The first aspect also contains, for example, a configuration wherein the number of lines is transferred at the same timing among the counters. In this configuration, however, it is necessary to execute a special control for each counter to determine what time the transferred number should be updated for use. In contrast, according to the sixth aspect, when the first exposure enabling time period is terminated, the first counter transmits the number of lines to the second counter. Thus, after the number of lines is transmitted, the second counter simply terminates the second exposure enabling time period by using the number of lines, and the special control is not necessary.

(7) According to seventh aspect, there is provided the image forming apparatus according to the fifth aspect or the sixth aspect, wherein the first counter counts the number of the successive lines of the first image data regardless of whether the first exposure unit forms each lines of the first electrostatic latent image and the second counter counts the number of the successive lines of the second image data regardless of whether the second exposure unit forms each lines of the second electrostatic latent image.

To form an image on the medium, if the image does not use one of the colors that the image forming apparatus has, the exposure processing for the photoconductor corresponding to the unused color is not required and essentially it is not necessary to perform the above-mentioned count processing. In the seventh aspect, however, all counters are caused to execute count processing regardless of whether or not the exposure processing is required. Accordingly, the length of the second exposure enabling time period can always be changed in the same processing regardless of whether or not the exposure processing of each photoconductor is required.

(8) According to an eighth aspect, there is provided the image forming apparatus according to any one of the third to seventh aspects, wherein the change unit has: a first control circuit which is configured to generate a first enabling signal indicating the first exposure enabling time period; and a second control circuit which is electrically connected to the first control circuit to receive the first enabling signal and is configured to generate a second enabling signal indicating the second exposure enabling time period based on the received first enabling signal, the second control circuit controls the first exposure unit and the second exposure unit based on the received first enabling signal and the generated second enabling signal.

The first control circuit generates only the first enabling signal indicating the first exposure enabling time period corresponding to the first photoconductor, and the second control circuit generates the second enabling signals indicating the second exposure enabling time periods corresponding to the second photoconductors. With this configuration, the wiring between the first control circuit and the second control circuit can be simplified while disposing the second control circuit near to the exposure unit, and disposing the first control circuit at a distance from the second control circuit.

(9) According to a ninth aspect, there is provided the image forming apparatus according to the first aspect or the second aspect, further comprising: a storage unit which is configured to store correspondence information between each rotation phase of the second photoconductor and each normal time period in which the difference between the number of the successive lines of the first image data and the number of the successive lines of the second image data falls within a range; and a determination unit which is configured to determine a rotation phase of the second photoconductor at a time when the second exposure enabling time period is started, wherein the change unit changes the second exposure enabling time period to a normal time period corresponding to the determined rotation phase based on the correspondence information.

With this configuration, deterioration of the image quality caused by rotation speed fluctuation of the photoconductor and transfer rotation body can be suppressed without providing any counter for counting the number of lines.

What is claimed is:

1. An image forming apparatus comprising:
   a first photoconductor;
   a second photoconductor disposed at a downstream side of the first photoconductor in a moving direction of a medium;
   a first exposure unit which is configured to form a first electrostatic latent image on the first photoconductor line by line at first exposure timing intervals in a first exposure enabling time period based on successive lines of first image data;
   a second exposure unit which is configured to form a second electrostatic latent image on the second photoconductor line by line at second exposure timing intervals in a second exposure enabling time period based on successive lines of second image data;
   a correction unit which is configured to correct at least one of the first exposure timing intervals so as to adjust first transfer position intervals between successive lines of a first visible image provided by developing the first electrostatic latent image and the second exposure timing intervals so as to adjust second transfer position intervals between successive lines of a second visible image provided by developing the second electrostatic latent image; and
   a change unit which is configured to change the second exposure enabling time period so as to suppress a difference between the number of the successive lines of the first image data for forming the first electrostatic latent image on the first photoconductor in the first exposure enabling time period and the number of the successive lines of the second image data for forming the second electrostatic latent image on the second photoconductor in the second exposure enabling time period.

2. The image forming apparatus according to claim 1, further comprising a driving unit which is configured to rotate at least one of the first photoconductor and the second photoconductor,
   wherein the correction unit corrects at least one of the first exposure timing intervals in response to rotation speed fluctuation of the first photoconductor and the second exposure timing intervals in response to rotation speed fluctuation of the second photoconductor.

3. The image forming apparatus according to claim 1,
   wherein the change unit starts counting the number of the successive lines of the second image data when the second exposure enabling time period is started; and
   wherein the change unit terminates the second exposure enabling time period when the difference between the number of the successive lines of the first image data and the number of the successive lines of the second image data falls within a range.

4. The image forming apparatus according to claim 3, further comprising a detection unit which is configured to detect the length of the medium in the moving direction, wherein the change unit changes the first exposure enabling time period based on the detected length.

5. The image forming apparatus according to claim 3, wherein the change unit has a first counter which is configured to count the number of the successive lines of the first image data and a second counter which is configured to count the number of the successive lines of the second image data; and wherein the first counter transmits the number of the successive lines of the first image data to the second counter.

6. The image forming apparatus according to claim 5, wherein the first counter transmits the number of the successive lines of the first image data to the second counter when the first exposure enabling time period is terminated.

7. The image forming apparatus according to claim 5, wherein the first counter counts the number of the successive lines of the first image data regardless of whether the first exposure unit forms each lines of the first electrostatic latent image and the second counter counts the number of the successive lines of the second image data regardless of whether the second exposure unit forms each lines of the second electrostatic latent image.

8. The image forming apparatus according to claim 3, wherein the change unit has:

a first control circuit which is configured to generate a first enabling signal indicating the first exposure enabling time period; and a second control circuit which is electrically connected to the first control circuit to receive the first enabling signal and is configured to generate a second enabling signal indicating the second exposure enabling time period based on the received first enabling signal, the second control circuit controls the first exposure unit and the second exposure unit based on the received first enabling signal and the generated second enabling signal.

9. The image forming apparatus according to claim 1, further comprising:

a storage unit which is configured to store correspondence information between each rotation phase of the second photoconductor and each normal time period in which the difference between the number of the successive lines of the first image data and the number of the successive lines of the second image data falls within a range; and a determination unit which is configured to determine a rotation phase of the second photoconductor at a time when the second exposure enabling time period is started, wherein the change unit changes the second exposure enabling time period to a normal time period corresponding to the determined rotation phase based on the correspondence information.

\* \* \* \* \*